United States Patent Office 2,835,654
Patented May 20, 1958

2,835,654

PROCESS FOR MAKING ELASTOMERS FROM POLYMERIC BIS-CHLOROFORMATES, PHOSGENE AND DIAMINES

Albert S. Carter, New Castle, and Maurice L. Ernsberger, Wilmington, Del., assignors to E. I. du Pont de Nemours and Company, Wilmington, Del., a corporation of Delaware No Drawing. Application October 11, 1954
Serial No. 461,657

11 Claims. (Cl. 260—75)

This invention relates to the preparation of curable polyurethane-urea elastomers containing the residues of high molecular weight glycols. More particularly it relates to a process in which such elastomers are formed by the reaction of high molecular weight bis-chloroformates, phosgene and primary diamines.

In pending application Serial No. 365,270 of Frederick B. Hill, Jr., filed June 30, 1953, there are disclosed and claimed elastomeric products formed by the reaction of a high molecular weight polyalkylene ether glycol, an organic diisocyanate and a chain extending agent such as water or an organic diamine. In the formation of these products, urethane groups, —NHCOO—, are formed by the reaction between the hydroxyl groups of the polyalkylene ether glycol and the isocyanate groups, while urea groups, —NH—CO—NH—, are formed by reaction of the isocyanates with water or a diamine. The resulting polymeric product accordingly contains a plurality of both urethane and urea groups and also of the residues of the polyalkylene ether glycol. These polymers are highly valuable products which can be cured to give elastomers having outstanding resistance to abrasion and ability to withstand low temperatures without becoming brittle.

In Angewandte Chemie 62, 57 (1950), there are disclosed elastomers prepared by the reaction of polyesters having hydroxyl end groups with organic diisocyanates followed by further reaction with water.

Although these products possess outstanding properties, they are relatively expensive, since the isocyanates which are required as ingredients in the process are themselves expensive chemicals. Furthermore, it is necessary to use heavy-duty mixing equipment in the preparation of these products. The high reactivity of diisocyanates makes it necessary to control the proportions of ingredients very carefully in order to obtain the desired products. Where an excess of isocyanate is present in the resulting elastomer, the product will be self-curing and cannot be stored for any appreciable time before compounding and curing without premature and unwanted vulcanization taking place.

It is an object of this invention to provide a new chemical process for preparing elastomers having essentially the same composition as those described above but which can be carried out in simple apparatus using cheaper raw materials. A further object is to provide a method for making condensation products of this type which are not susceptible to premature curing. Other objects will appear from the description of this invention which follows.

According to this invention, curable elastomeric condensation products are prepared by agitating together in aqueous medium and in the presence of an acid acceptor an organic bis-chloroformate having a molecular weight of at least 875, a primary diamine, and phosgene, the molar ratio of the bis-chloroformate to phosgene being from 1:0.15 to 1:20 and the ratio of the moles of diamine to the sum of the moles of bis-chloroformate and phosgene being from 0.5:1 to 2:1.

In a representative and preferred embodiment of this invention, condensation products are obtained by adding a mixture of one mole of a polytetramethylene ether bis-chloroformate having a molecular weight of at least 875 and from 0.15 to 10 moles of phosgene to a vigorously agitated aqueous medium containing 2,4-tolylenediamine, an acid acceptor such as sodium hydroxide, and an acid-stable emulsifying agent such as the sodium sulfate of a higher alcohol. From 0.5 to 2.0 moles of the diamine are used for each mole of phosgene and bis-chloroformate. The condensation polymer which is formed is insoluble in water. When the reaction is completed, the product is separated from the reaction medium, washed and dried and is then ready for compounding and curing to yield the ultimate cured elastomer.

The bis-chloroformates useful in the process of this invention are compounds having the formula

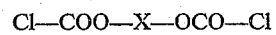

Cl—COO—X—OCO—Cl in which X is a bivalent organic radical having a formula weight of at least 716. They are prepared by the reaction between high molecular weight gylcols (having the formula HOXOH) and phosgene. The bis-chloroformates useful in this invention have average molecular weights which are at least 875 and may be as high as 10,000, molecular weights of 875 to 3500 being preferred. The molecular weights referred to here and elsewhere throughout the specification and claims represent number average values.

A preferred class of high molecular weight bis-chloroformates for this process are the polyalkylene ether bis-chloroformates. These compounds have the formula Cl—COO(RO)$_n$CO—Cl, in which R represents an alkylene radical and $n$ is an integer sufficiently large that the compound has a molecular weight of at least 875, corresponding to a polyalkylene ether gylcol having a molecular weight of at least 750. The alkylene radical R preferably contains no more than about 10 to 12 carbon atoms. Not all the alkylene radicals need be the same.

The preferred polyalkylene ether bis-chloroformate is polytetramethylene ether bis-chloroformate, also known as polybutylene ether bis-chloroformate. This product is made by the reaction of phosgene with polytetramethylene ether glycol, which may be made by the polymerization of tetrahydrofuran. Polyethylene ether bis-chloroformate, polypropylene ether bis-chloroformate, 1,2-polydimethylethylene ether bis-chloroformate and polydecamethylene ether bis-chloroformate are other typical representatives of the class.

Instead of the hydrocarbon portion of the polyether bis-chloroformates being entirely alkylene, the compound can contain arylene or cycloalkylene radicals together with the alkylene radicals as, for example, in the bis-chloroformate obtained by reacting phosgene with a condensation product of a polyalkylene ether glycol with α,α'-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylylene radicals. Elastomers made using polyalkylene-arylene or polyalkylene-cycloalkylene ether bis-chloroformates have improved freeze resistance as compared with the corresponding elastomers containing no cyclic radicals.

Another class of bis-chloroformates useful in this invention are the polyether-polythioether bis-chloroformates obtained by reacting phosgene with a long chain diol containing a plurality of intralinear sulfur and oxygen atoms.

Such diols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the diol has a molecular weight of at least 750. These diols may be made by condensing together glycols and thioglycols in the presence of a catalyst such as p-toluene sulfonic acid.

Another useful class of bis-chloroformates are the polyester bis-chloroformates, which are made by the action of an excess of phosgene on linear polyesters having hydroxyl end groups. The linear polyesters are prepared by reacting dibasic acids such as succinic, maleic, glutaric, malonic, isophthalic, adipic, azelaic, sebacic, hexahydroterephthalic, p-phenylene diacetic, and the like with glycols such as ethylene, propylene-1,2, propylene-1,3, diethylene, butylene, hexamethylene, decamethylene, thiodiglycol and the like. Usually a slight excess of glycol is employed to insure the presence of hydroxyl end groups in the polyester. A preferred polyester bis-chloroformate is obtained from a polyester made by condensing adipic acid with at least one glycol, such as butanediol-1,4 or a mixture of ethylene glycol and propylene glycol.

There may also be used as the bis-chloroformates in the process of this invention products made by reacting an excess of phosgene with a long chain compound terminating in a hydroxyl group, said groups being connected by a hydrocarbon or a halogen-substituted hydrocarbon chain. The hydrocarbon chain connecting the hydroxyl groups is free of substituents other than halogen atoms and monovalent hydrocarbon radicals, such as methyl, phenyl, etc., preferably containing no more than 8 carbon atoms. Such long chain compounds are obtained, for example, by polymerizing ethylenically unsaturated monomers in the presence of free radical catalysts such as the aliphatic azo dinitriles or dicarboxylates. The most suitable ethylenically unsaturated monomers are conjugated dienes such as butadiene, isoprene, 2-chlorobutadiene and the like. Mixtures may be used. For example, styrene or isobutylene may be copolymerized with a diene to give the long chain skeleton. The carbon chain in the long chain compound may be saturated or unsaturated.

The primary diamine which takes part in the reaction may be either aliphatic, cycloaliphatic or aromatic, the aromatic diamines being preferred. Typical diamines useful in this invention are the tolylenediamines, the phenylenediamines, alkylenediamines such as ethylenediamine, tetramethylenediamine and decamethylenediamine, and cyclic diamines such as cyclohexyldiamine. Mixed types such as 4,4'-methylene-bis-(phenylamine) and heterocyclic diamines such as diaminopyridine are also operable. Amine hydrohalides may be used instead of the diamines, most of which are quite insoluble in water.

When a molecule of the diamine reacts with a molecule of the bis-chloroformate, a urethane group is formed according to the following reaction:

The reaction of a molecule of phosgene with two molecules of the diamine produces a urea group, as follows:

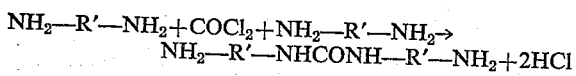

The condensation product resulting from the process of this invention therefore contains a plurality of urethane and of urea groups, linking together the long chain bivalent residues from the bis-chloroformate and the bivalent residues remaining from the diamine. The properties of the condensation product will depend to a considerable extent on the relative proportions of urea and urethane linkages, since the hydrogels present in urea groups are believed to be appreciably more reactive than those present in the urethane groups and provide active sites at which cross-linking can take place during the subsequent curing of the reaction product. When less than 0.15 mole of phosgene is used for each mole of the bis-chloroformate, too few urea groups are formed in the condensation product to afford easy curing. When the molar ratio of phosgene to bis-chloroformate exceeds 10:1, the condensation product contains many urea groups and after curing has a high modulus, i. e., is stiff. When this ratio exceeds 20:1, the modulus becomes so high as to make the product essentially useless as an elastomer. Preferably from 0.7 to 3 moles of phosgene are used for each mole of the bis-chloroformate. Products made using these proportions have good millability and after curing have desirable resilience and modulus.

The amount of the diamine used should ordinarily be equal to or slightly greater than the equivalent amount required for reaction with the bis-chloroformate and the phosgene, although from 50 to 200% of this amount may be used. If there is not enough of the diamine to react with all the —COCl groups, the unreacted groups hydrolyze and give free hydroxyl or carboxyl groups. An excess of the diamine results in the presence of free amino groups in the condensation product. A large excess acts as a quenching agent, effectively saturating all the —COCl groups and preventing further condensation. Preferably the diamine should be present to the extent of about 100 to 130% of stoichiometric theory.

Although the reaction may be carried out by adding all three ingredients simultaneously it is generally preferable to add a mixture of the bis-chloroformate and phosgene to an aqueous medium containing the diamine either in suspension or in solution. In this way, reaction of each of the other reactants with the diamine takes place concurrently and produces condensation products having randomly distributed urea and urethane groups. For convenience of operation, it is sometimes desirable that the mixture of the bis-chloroformate and phosgene be dissolved in a solvent. Use of a solvent is advisable when it is required to give a fluid mixture which is easy to handle and can be readily mixed with the suspension or solution of the diamine. The solvent may be any normally non-reactive material and is preferably a hydrocarbon such as toluene, xylene, benzene or the like. A relatively volatile solvent, e. g., boiling below 120–130° C., is preferred because of the ease with which it can be removed from the resulting condensation product.

The bis-chloroformate which has been prepared by the reaction of phosgene with a high molecular weight glycol frequently contains excess phosgene and it is then necessary only to adjust the amount of phosgene to give the desired proportions, either by removing or adding phosgene. If the bis-chloroformate is entirely free from phosgene, it is necessary to add all of the desired amount.

The amount of water used as a reaction medium is not critical, but it is desirable to use fairly dilute solutions or suspensions to make possible good mixing and intimate contact of the reactants without excessive power consumption. The aqueous suspension or solution is preferably maintained at a temperature between the freezing point and about 30° C. At higher temperatures, there is a tendency for the bis-chloroformate to hydrolyze and for other undesirable side reactions to take place.

The aqueous reaction medium should contain enough of an acid acceptor to react with the hydrochloric acid formed by reaction of the diamine with the bis-chloroformate and the phosgene. Suitable acid acceptors include the alkali metal hydroxides, such as sodium hydroxide, and buffer salts such as those of the alkali metals with weak acids, e. g. sodium acetate, sodium borate, and the like. These compounds may be added to the reaction mixture either before or after the bis-chloroformate and phosgene have been mixed with the diamine. The pH of the reaction mixture is preferably maintained between about 3 and about 9, although the reaction will proceed at a pH as high as 11.

In order to obtain adequate contact between the reactants, it is desirable that an acid-stable emulsifying agent that is non-reactive with the bis-chloroformate, the phosgene and the amine should be present. Suitable emulsifying agents are those surface active materials having sulfate, sulphonate or phosphate solubilizing groups, such as the long-chain alkyl sodium sulfates or sodium phosphates, alkyl-aryl sulfonates, lignin sulfonates, and the ethylene oxide condensation products of long-chain alcohols or fatty acids. Sodium dodecyl sulfate, sodium lauryl sulfate, sodium lauryl phosphate, dodecyl benzene sulfonate, and the reaction product of 16 to 20 moles of ethylene oxide with 1 mole of cetyl or oleyl alcohol are typical emulsifying agents suitable for this purpose. Partially desulfonated lignin sodium sulfonate, sold as "Marasperse" CB by the Marathon Chemical Corp., is a particularly useful emulsifying agent for this purpose. When no emulsifying agent is present, it is difficult to secure adequate contact between the several reactants and proper dispersion of the condensation product. The emulsifying agent may, however, be dispensed with if provision is made for vigorous and powerful agitation. Thus when the bis-chloroformate and the phosgene are added in the form of a toulene solution, a high-speed agitator such as an Eppenbach homomixer will produce very satisfactory dispersion. The rate of addition of the bis-chloroformate and phosgene to the aqueous diamine solution or suspension should be sufficiently slow that adequate mixing can take place.

As the condensation reaction proceeds, the reaction product separates from the aqueous suspension in which it is formed as a more or less loose elastomeric mass. This mass is separated from the aqueous medium, as for example by simply lifting it out, and is then placed on an ordinary rubber wash mill. This type of mill, which is common in the rubber industry, comprises at least one corrugated roll opposing another roll. The condensation product is macerated between the two rolls and water is added to wash out water-soluble impurities. When the product becomes essentially neutral, it is transferred to a conventional smooth drying mill and is milled at 100 to 110° C. until it is dry.

The resulting elastomeric product may then be compounded with a curing agent, which is ordinarily a diisocyanate, and cured by heating. The diisocyanate curing agents react with the condensation product at sites where active hydrogens are present, particularly in the form of urea groups, and produce a cross-linked structure. Normally there is used from 1 to 20 parts by weight of a diisocyanate such as 2,4-tolylene diisocyanate, the dimer of 2,4-tolylene diisocyanate, bis(3-isocyanato-4-methylphenyl)urea or the like. Curing is often facilitated by the incorporation of a small amount of magnesium oxide with the diisocyanate curing agent. Carbon black, silica, metal oxides, plasticizers or other compounding agents ordinarily used in the rubber industry may also be added at this point. The curing agents and other compounding materials are milled into the polymer on a smooth rubber mill and the compounded elastomer is then cured by heating at 100 to 150° C. under enough pressure to cause the elastomer to assume the shape of the mold. Ordinary rubber processing machinery is satisfactory for this purpose. The time of cure varies from about fifteen minutes to several hours depending on the temperature, the lower temperatures requiring longer curing times.

The process of this invention is illustrated by the following examples in which parts are by weight unless otherwise indicated.

EXAMPLE 1

A.—Preparation of polytetramethylene ether bis-chloroformate

A solution of 226 parts of polytetramethylene ether glycol having an average molecular weight of 2910 in 113 parts of toluene is added slowly with stirring to a solution of 24.5 parts of phosgene dissolved in 114 parts of toluene at 4–8° C. After all the solution is added, stirirng at 4–8° C. is continued for 1.5 hours. The conversion to bis-chloroformate is believed to be essentially 100%.

B.—Preparation of elastomer 450 parts of the bis-chloroformate solution prepared above consisting of 221 parts polytetramethylene ether bis-chloroformate, 8.6 parts phosgene, 5.33 parts hydrogen chloride, and 215 parts toluene are added slowly over a period of 36 minutes at 10–11° C. to an agitated solution containing 20.1 parts of 2,4-tolylenediamine, 20.8 parts of sodium hydroxide, 2.5 parts of "Duponol" ME dry fatty alcohol sodium sulfate, a sodium alkyl sulfate in which the alkyl is derived from a mixture of normal alcohols, predominantly dodecyl and tetradecyl with minor amounts of decyl and hexadecyl, and 2000 parts of water. The resulting suspension is stirred for 12 minutes at 10–15° C., and for 5 minutes at 20° C. and is then allowed to stand overnight at room temperature. During this time a mass of elastic polymer separates. The polymer is removed, washed with water on a corrugated rubber mill and dried on a smooth rubber mill at 105–110° C.

100 parts of the polymer are milled on a rubber mill with 8 parts of the dimer of 2,4-tolylene diisocyanate and 3 parts of MgO until a homogeneous mix is formed. A portion is then put in a mold and cured under pressure for 18 hours at 70° C.

Similar elastomers are prepared using essentially the same procedure and ingredients as described above, but varying the molar ratio of bis-chloroformate to phosgene. The properties of the resulting cured rubbery polymers are as follows:

| Sample | 1 | 2* | 3 | 4 |
| --- | --- | --- | --- | --- |
| Ratio: bis-chloroformate to phosgene | 1/1.19 | 1/2.0 | 1/8.46 | 1/19.05 |
| Tensile strength, p. s. i | 2,200 | 3,950 | 4,580 | 3,440 |
| Modulus at 300% elongation, p. s. i | 430 | 1,050 | 2,580 | 3,440 |
| Elongation at break, percent | 670 | 650 | 460 | 300 |

*In the preparation of this sample, sodium acetate is used in place of sodium hydroxide as the acid acceptor, and N,N'-bis(3-isocyanato-4-methylphenyl)urea in place of 2,4-tolylene diisocyanate dimer as the curing agent.

Other cured elastomers are prepared using essentially the same procedure described above but using sodium carbonate and a mixture of sodium hydroxide and boric acid, respectively, as acid acceptors in place of sodium hydroxide.

EXAMPLE 2

A.—Preparation of the bis-chloroformate

The bis-chloroformate of a polytetramethylene ether glycol of average molecular weight 3500 is prepared by slowly adding 200 parts of the molten glycol to approximately 80 parts of liquid phosgene while agitating under a reflux condenser. The temperature is about 8° C. at the start and gradually increases to 19–20° C. at the finish. The mixture remains fluid and readily stirrable throughout the addition. The final mixture is warmed to 25–26° C. and is swept with a current of dry nitrogen to remove a portion of the excess phosgene. The phosgene content of the residue is determined periodically according to the method described in J. Anal. Chem. 20, 645 (1948). When a concentration of 6.15% of phosgene by weight is attained, a 20 part portion is removed for use in polymer preparation.

B.—*Preparation of polymer*

To a rapidly stirred solution of 2.29 parts 2,4-tolylene diamine, 5.65 parts sodium acetate ($CH_3COONa.3H_2O$), 0.29 part "Duponol" ME dry fatty alcohol sodium sulfate, and 155 parts water at 25–26° C. is added to the mixture described above, consisting of 18.77 parts polytetramethylene ether bis-chloroformate and 1.23 parts phosgene. Stirring is continued for 10 minutes after the addition is complete. A soft, tacky, coagulated mass separates. It is washed on a corrugated rubber mill and dried on a smooth rubber mill at 105–110° C.

17 parts of the rubbery polymer are thoroughly mixed on a rubber mill with 1.36 parts of N,N'-bis(3-isocyanato-4-methylphenyl)urea. The compounded mixture is put into a mold and cured under pressure at 134° C. for 60 minutes. The resulting rubbery polymer shows the following properties:

Tensile strength at the break, p. s. i._____ 2440
Modulus at 300% elongation, p. s. i._____ 400
Elongation at the break, percent_____ 800

EXAMPLE 3

The bis-chloroformate of a polytetramethylene ether glycol having a molecular weight of 2940 is prepared by the procedure described in Example 2, but removing phosgene until the mole ratio of phosgene to bis-chloroformate is 0.46:1.0. In order to increase the fluidity, benzene is added so that the final mixture contains 70.6% of the bis-chloroformate, 1.04% phosgene and 28.36% benzene.

37 parts of this mixture are added slowly to a well-stirred solution of 1.51 parts 2,4-tolylenediamine, 2.63 parts sodium carbonate and 0.2 part sodium long-chain alkyl sulfate ("Duponol" ME) in 234 parts of water. The temperature is held at about 10° C. during the addition. A rubbery polymer separates from the solution. After standing overnight, the polymer is washed with water and dried at 105° C.

10 parts of the polymer are mixed with 1 part of N,N'-bis(3-isocyanato-4-methylphenyl)urea and then placed in a mold and cured under heat and pressure (8 hours at 93° C.).

A similar product is made using twice as much 2,4-tolylenediamine. The products have the following properties:

| | | |
|---|---|---|
| Mole ratio of diamine/bis-chloroformate+phosgene | 1.0 | 2.0 |
| Intrinsic viscosity | 0.98 | 0.64 |
| Properties of vulcanizate: | | |
| Tensile strength at the break, p. s. i. | 3,880 | 4,715 |
| Modulus at 300% elongation, p. s. i. | 740 | 1,200 |
| Elongation at the break, percent | 600 | 620 |

EXAMPLE 4

Another preparation of the same polytetramethylene ether bis-chloroformate described in Example 3 is made, except that the mole ratio of bis-chloroformate to phosgene is adjusted to 1:1.18. The higher phosgene content makes the mass sufficiently fluid for use without any need for the addition of a solvent.

26 parts of the reaction mass, containing 25 parts of polytetramethylene ether bis-chloroformate and 0.95 part of phosgene, are added to 270 parts of water containing 1.63 parts of 2,4-tolylenediamine, 3.5 parts of sodium carbonate and 0.5 part of sodium alkyl sulfate ("Duponol" ME) while stirring vigorously. The temperature is maintained at about 10° C. and stirring is continued for 10 minutes after the addition is complete. A rubbery polymer separates which is washed with water and dried at 105° C.

A second polymer is made in the same way except that 3.81 parts of 2,4-tolylenediamine are used.

Both samples are cured by milling 10 parts of N,N'-bis(3-isocyanato-4-methylphenyl)urea into 100 parts of the polymer and heating the mixture in a mold under pressure for 8 hours at 93° C. The properties of the cured elastomers are shown below:

| | | |
|---|---|---|
| Parts of 2,4-tolylenediamine | 1.63 | 3.81 |
| Mole ratio of diamine/bis-chloroformate+phosgene | 0.75 | 1.76 |
| Intrinsic viscosity | 0.88 | 0.83 |
| Properties of vulcanizate: | | |
| Tensile strength at the break, p. s. i. | 4,600 | 3,180 |
| Modulus at 300% elongation, p. s. i. | 920 | 1,090 |
| Elongation at the break, percent | 610 | 550 |

Another 26 part portion of the bis-chloroformate/phosgene mixture is poured into the following vigorously stirred mixture of 4.42 parts 4,4'-diaminodiphenyl methane, 1.8 parts hydrogen chloride, 0.5 part sodium alkyl sulfate and 300 parts water. To the fine dispersion so formed, at 8° C., are added 5.0 parts of sodium hydroxide in 45 parts of water. A rubbery coagulum separates and is worked up and cured as described above. The cured elastomer has the following properties:

Tensile strength at the break, p. s. i._____ 2020
Modulus at 300% elongation, p. s. i._____ 830
Elongation at the break, percent_____ 470

EXAMPLE 5

A sample of the same polytetramethylene ether bis-chloroformate is prepared as in Example 4, except that the bis-chloroformate/phosgene ratio is adjusted to 1:8.57. Polymers are prepared from this product and cured by the procedure of Example 4. The ratios of reactants and properties of the products are as follows:

| | | |
|---|---|---|
| Mole ratio of diamine/bis-chloroformate+phosgene | .30 | 1.00 |
| Tensile strength at the break, p. s. i. | 5,540 | 2,360 |
| Modulus at 300% elongation, p. s. i. | 1,350 | 2,320 |
| Elongation at the break, percent | 650 | 370 |

EXAMPLE 6

255 parts of polytetramethylene ether glycol of molecular weight 1000 are dropped slowly into 210 parts of liquid phosgene under reflux. The temperature is allowed to rise from 8° C. to 22° C. during the addition while maintaining the reflux. The reaction mass is stirred for an hour at 22–25° C. and then heated at 30° C. under pressure of 526 mm. of mercury to remove phosgene until there remains 1.12 moles per mole of the polytetramethylene bis-chloroformate.

25 parts of this mass are added to 420 parts of water containing 7.84 parts of 2,4-tolylenediamine, 6.86 parts of sodium hydroxide and 0.70 part of sodium alkyl sulfate ("Duponol" ME) while stirring vigorously at 10° C. After a further 10–15 minute stirring the mass is allowed to stand and a polymer separates. After standing overnight, it is removed, washed with water and then dried at 105° C.

The rubbery polymer so obtained is mixed with 8 parts of N,N'-bis(3-isocyanato-4-methylphenyl)urea per 100 parts of polymer and then heated in a mold under pressure for 8 hours at 93° C. The resultant rubbery slab shows the following properties:

Tensile strength at the break, p. s. i._____ 3520
Modulus at 300% elongation, p. s. i._____ 1150
Elongation at the break, percent_____ 550

EXAMPLE 7

The bis-chloroformate of a polytetramethylene ether glycol of average molecular weight 8610 is prepared as in Example 2, removing phosgene until there remains 2.55 mols of phosgene per mole of polytetramethylene ether bis-chloroformate. The mass is quite viscous so benzene is added to dilute it. The final composition is 59.3% benzene, 39.6% polytetramethylene ether bis-chloroformate, and 1.14% phosgene.

55 parts of this material are added slowly to a well-stirred mixture of 125 parts of water, 1.2 parts of 4-methyl-1,3-diaminocyclohexane, 1.5 parts of sodium hydroxide and 0.3 part of sodium alkyl sulfate ("Duponol"

ME) at about 10° C. The mass is stirred 10–15 minutes longer and then allowed to stand. A rubbery mass separates. After several hours it is removed from the liquid, washed with water and then dried at 105° C.

10 parts of the polymer are thoroughly mixed with 1.0 part of N,N'-bis(3-isocyanato-4-methylphenyl)urea and cured by heating in a mold under pressure at 93° C. for 8 hours. The resulting elastomer shows the following properties:

Tensile strength at the break, p. s. i. _____ 1520
Modulus at 300% elongation, p. s. i. _____ 860
Elongation at the break, percent _____ 410

EXAMPLE 8

A polytetramethylene ether bis-chloroformate is made from polytetramethylene ether glycol of average molecular weight 3100 as in the previous examples. The ratio of bis-chloroformate to phosgene is adjusted to 1:1.58.

25.25 parts of this mixture, containing 24.09 parts of polytetramethylene ether bis-chloroformate and 1.16 parts of phosgene, are slowly added to a rapidly stirred solution of 4.24 parts of decamethylene diamine, 4 parts of sodium hydroxide, 1 part of sodium alkyl sulfate and 16 parts of tetrahydrofuran in 310 parts of water at room temperature. The polymer forms as a fine emulsion which slowly coalesces into a solid polymer over a period of several days. The polymer is washed with water and dried at 105° C. The polymer is compounded and cured as in Example 6, with the following results:

Tensile strength at the break, p. s. i. _____ 1900
Modulus at 300% elongation, p. s. i. _____ 570
Elongation at the break, percent _____ 650

EXAMPLE 9

A mixture of phosgene and bis-chloroformate is prepared as in the preceding examples, using a polytetramethylene ether glycol of molecular weight 2630. The mixture analyzes 1 mole of the polytetramethylene ether bis-chloroformate to 1.41 moles of phosgene. Separate portions of this mixture are then reacted with diamines in the same way as in the previous examples and with the exact conditions shown in the table below.

| Diamine | m-Tolylene-diamine | 1,5-Diamino-naphthalene | Benzidine |
|---|---|---|---|
| Amount of: | | | |
| diamine | 3.05 | 3.86 | 4.93. |
| toluene | 160 | 160 | 200. |
| pyridine (acid acceptor) | 15 | 100 | 20. |
| bis-chloroformate phosgene mixture | 25.45 | 25.04 | 25.35. |
| Reaction temp., °C | 5 | 15 | 15. |
| Mol ratio diamine/(bis-chloroformate+phosgene) | 1.18 | 1.18 | 1.27. |
| Raw polymer | Good milling rubber. | Soft rubber. | Tough rubber. |

All of these products are curable by the previous procedures to give elastomers having good physical properties.

EXAMPLE 10

The bis-chloroformate of a polypropylene ether glycol of average molecular weight 830 is prepared by the procedure of Example 2. The resulting mixture contains 1.4 moles of phosgene per mole of polypropylene ether bis-chloroformate.

25 parts of this mixture, containing 21.84 parts polypropylene ether bis-chloroformate and 3.16 parts phosgene, are added slowly to an aqueous solution of 8.04 parts of m-tolylenediamine, 1 part of sodium alkyl sulfate, and 10 parts of sodium carbonate in 300 parts of water. The reaction mixture is stirred vigorously during the addition and the temperature is held at 8–10° C. The finely divided elastomer dispersion coalesces on standing without agitation. The mass is removed, washed with water, and dried. 10 parts of 1,3-bis(3-isocyanato-4-methylphenyl)urea are thoroughly milled into 100 parts of the polymer and the product is cured in a mold in a press at 100° C. for 6 hours to give a good rubbery slab. The properties of the elastomer after standing 14 days at 50% relative humidity are:

Tensile strength at the break, p. s. i. _____ 1220
Modulus at 300% elongation, p. s. i. _____ 980
Elongation at the break, percent _____ 500

EXAMPLE 11

653 parts of polytetramethylene ether glycol of average molecular weight 2985 are slowly added to 490 parts of phosgene in a vessel equipped with agitation and a reflux condenser. The temperature gradually rises from 8° C. to 16° C. during the addition. The stirring is continued for an hour longer at 16–17° C. The mixture is then heated to 30° C. under somewhat reduced pressure without reflux, until the molar ratio of phosgene to polytetramethylene ether bis-chloroformate drops to 1.27:1 as shown by analysis.

176 parts of this mixture which contains 169.1 parts of the bis-chloroformate and 6.86 parts of phosgene are added to a vigorously stirred solution of 16.5 parts of m-tolylenediamine, 0.9 part partially desulfonated sodium lignin sulfonate (sold as "Marasperse" CB by the Marathon Chemical Corp.), 76 parts of $$Na_2HPO_4.7H_2O$$

and 97 parts of $Na_3PO_4.12H_2O$ in 1500 parts of water. The temperature during the addition is about 22–26° C. The polymer forms in very finely divided particles (less than 0.5 micron in diameter). The dispersion coagulates slowly on standing. The coagulated polymer is filtered off, washed with water, and dried.

100 parts of the polymer and 8 parts of 1,3-bis(3-isocyanato-4-methylphenyl)urea are thoroughly mixed on a rubber mill and then cured by heating in a mold in a press at 134° C. for 15 minutes. The resulting rubbery slab is conditioned for 14 days at room temperature at 50% relative humidity and tested.

Tensile strength at the break, p. s. i. _____ 5030
Modulus at 300% elongation, p. s. i. _____ 930
Elongation at the break, percent _____ 570

EXAMPLE 12

235 parts of polyethylene ether glycol of average molecular weight 1325 dissolved in 430 parts of toluene are slowly added to 280 parts of phosgene dissolved in 172 parts of toluene. The reaction vessel is equipped with an agitator and a reflux condenser to return vaporized phosgene. The temperature rises from 18° to 31° C. during the addition. The mixture is stirred a short time longer and then swept with a curent of nitrogen to remove phosgene until analysis shows 1.32 moles of phosgene per mole of polyethylene ether bis-chloroformate.

203 parts of this mixture, containing 62.05 parts of polyethylene ether bis-chloroformate, 5.58 parts of phosgene and 135.37 parts of toluene, are added to a rapidly stirred solution of 6.27 parts of m-tolylene diamine, 1.2 parts of sodium alkyl sulfate, 35 parts of $Na_3PO_4.12H_2O$ and 27 parts of $Na_2HPO_4.7H_2O$ in 550 parts of water. The temperature rises from 8° C. to 19° C. during the addition. The finely divided polymer slowly coalesces on standing. The coagulated polymer is removed from the water, washed with water and dried on a heated rubber mill. On compounding with 8 parts of 1,3-bis(3-isocyanato-4-methylphenyl)urea per 100 parts of polymer and heating in a mold in a press at 134° C. for 15 minutes a soft rubbery slab is obtained.

EXAMPLE 13

1990 parts of polyteramethylene ether glycol of average molecular weight 985 and 264 parts of α,α-dibromo-p- xylene are stirred while 140 parts of potassium hydroxide pellets are added gradually, the temperature being held at 75° C. Stirring at 75° C. is continued for 20 hours. The mass is then poured into a well agitated dilute aqueous hydrochloric acid solution containing more than enough acid to neutralize the residual KOH. The product layer is washed with water until acid-free, and dried by heating to 80–90° C. under vacuum. The molecular weight based on the hydroxyl number is 2070. The glycol has the following average structure:

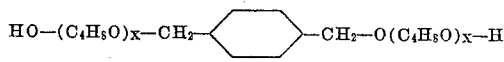

where X is 13–14.

51 parts of this polyether glycol are added to a well-stirred vessel containing 140 parts of phosgene at about 8° C. The temperature rises to about 18° C. during the addition and vaporized phosgene is condensed and returned to the mass by a reflux condenser. After stirring for a short while, the mass is put under a slight vacuum and phosgene is removed until the molar ratio of phosgene to polytetramethylenexylylene-ether glycol bis-chloroformate is 1.5:1.

25.4 parts of this mixture is mixed with 4.3 parts of toluene to increase its fluidity and is then added slowly to a well-stirred solution of 4.13 parts of m-tolylenediamine, 6 parts of sodium carbonate and 0.15 part of sodium lignin sulfonate ("Marasperse" CB) in 200 parts of water. The finely divided polymer gradually coalesces on standing. The coagulated mass is washed with water and then dried.

100 parts of the polymer are compounded with 6 parts of 1,3-bis(3-isocyanato-4-methylphenyl)urea and 1 part of magnesium oxide and then cured by heating in a mold at 134° C. for 15 minutes. A rubbery slab is obtained which does not freeze when held at −20° C. for several days.

EXAMPLE 14

A mixture of 549 parts of thiodiglycol in 200 parts of benzene, 405 parts of 1,4-butanediol, and 13.5 parts of p-toluene sulfonic acid monohydrate are heated together in a vessel equipped with a Dean-Stark type of distillate trap. A water-benzene azeotrope distills off and is collected in the trap. The benzene layer which separates is returned to the system. After about 146 parts of water have been distilled off, an additional 82.3 parts of thiodiglycol are added. Azeotropic distillation of water is continued until 161.7 parts of water are removed. Toward the end of the reaction, benzene is no longer returned to the system.

The reaction mass is stirred hot with excess aqueous sodium carbonate to neutralize the p-toluene sulfonic acid. The aqueous layer is removed and the polyether glycol layer is washed first with dilute hydrochloric acid and then with water until it is neutral. The product is treated with activated charcoal, filtered, and dried under vacuum. Analysis shows:

Hydroxyl No. _____ 77.3
Sulfur _____percent__ 19.9
Mol. Wt. (calc. from OH No.) _____ 1452

The general structural formula may be written as follows: $HOC_2H_4SC_2H_4O(C_4H_8OC_2H_4SC_2H_4O)_xH$, where x is sufficient to give the agerage molecular weight of 1452.

20 parts of this polyethylene tetramethylene etherthioether glycol is added to 140 parts of phosgene as described in the previous examples and the excess phosgene is removed until the molar ratio of phosgene to bis-chloroformate is 1.5. 18.2 parts of this mixture are mixed with 4.2 parts of toluene to make it more fluid and the mixture is then added slowly to a well-stirred solution of 3.5 parts m-tolylenediamine, 5.6 parts sodium carbonate, and 0.1 part lignin sulfonate ("Marasperse" CB) in 150 parts of water at 5–10° C. The finely dispersed polymer coagulates slowly on standing. After it has coagulated, it is washed with water and then dried.

100 parts of the polymer are milled at 130° C. for a short time and 6 parts of 1,3-bis(3-isocyanato-4-methylphenyl)-urea and 1 part of magnesium oxide are then thoroughly mixed in. Total milling time is about 1 hour. The compounded polymer is then heated in a mold in a press at 134° C. for 1 hour to give a good rubbery slab that remains flexible after being exposed at 0° C. for several days.

EXAMPLE 15

600 parts of 2-chlorobutadiene-1,3 and 154.8 parts of diethyl-2,2'-azobis(isobutyrate) are dissolved in 1560 parts of toluene and heated for 4.5 hours at 88–90° C. Then 6 parts of 2,6-diisobutyl-4-methylphenol are added as an antioxidant. The toluene is removed under vacuum and the residue is dissolved in 1370 parts of diethyl ether.

54 parts of lithium aluminum hydride are added to 2740 parts of anhydrous diethyl ether and the mixture heated to reflux to dissolve as much as possible. To this solution is slowly added the ethereal solution of the chlorobutadiene polymer and the mixture is heated to reflux for 2 hours. The excess lithium aluminum hydride is destroyed by carefully adding 155 parts of water. The mixture refluxes from the heat of reaction. Then 25% aqueous sulfuric acid is added until all the solid is dissolved. The lower aqueous layer is withdrawn and the ethereal layer is washed with saturated sodium bicarbonate solution until acid-free, washed with water, and dried. The ether is distilled off, leaving 582 parts of a viscous liquid polychloroprene glycol having a hydroxyl number of 73.4, corresponding to an average molecular weight of 1525.

170 parts of this polychloroprene glycol is slowly added to 560 parts of liquid phosgene in a vessel equipped with agitation and a reflux condenser. The temperature is 8 to 10° C. during the addition. A moderate vacuum is applied to the system and phosgene is removed until the molar ratio of phosgene to the polychloroprene bis-chloroformate is 1.5:1.

25 parts of this mixture are added to a well-stirred solution of 5.11 parts m-tolylenediamine, 7.4 parts sodium carbonate, and 0.13 part lignin sulfonate ("Marasperse" CB) in 250 parts of water at 9–12° C. On standing, the finely divided polymer slowly coagulates, and is removed, washed with water, dried, and sheeted off.

To 100 parts of the polymer on a rubber mill are added 6 parts of 1,3-bis(3-isocyanato-4-methylphenyl)urea and 1 part of magnesium oxide. After thorough mixing, the compounded rubber is cured by heating in a mold in a press at 134° C. for 1 hour. A snappy rubbery slab is obtained with a tensile strength of 1250 lbs./sq. in. at the break.

EXAMPLE 16

A linear polyester is made in the conventional way by heating together 1,4-butanediol and adipic acid and removing water until there is obtained a polybutylene adipate ester of hydroxyl number 53.0, acid number 3.2, and molecular weight 2000.

137 parts of this polyester are slowly added to 210 parts of liquid phosgene in a vessel fitted with agitation and a reflux condenser. During the addition the temperature rises from 8 to 16° C. After stirring about 30 minutes longer, phosgene is removed under partial vacuum until the molar ratio of phosgene to bis-chloroformate is 1.28:1. Toluene is added to the mass in the latter stages to maintain adequate fluidity. The final composition is 57.6% polyester bis-chloroformate, 3.43% phosgene, and 38.97% toluene.

35.3 parts of this mixture are added to a vigorously stirred solution of 3.16 parts of m-tolylenediamine, 4.6 parts of sodium carbonate, and 0.15 part of sodium lignin sulfonate ("Marasperse" CB) in 175 parts of water at 10–15° C. A good dispersion of a granular polymer is obtained. On standing, the polymer coagulates and is removed, washed with water, dried, and sheeted off. 100 parts of the raw polymer are mixed with 6 parts of 1,3-bis (3-isocyanato-4-methylphenyl)urea and 2.3 parts of magnesium oxide on a rubber mill. The compounded polymer is cured by heating in a mold in a press at 134° C. for 30 minutes. A soft rubbery slab with moderate tensile strength is obtained.

Instead of using a single diamine and a single bis-chloroformate in the formation of the products of this invention, mixtures of two or more of either or both of these compounds may be used.

Elastomers prepared according to the process of this invention may be used in the preparation of sheets, tubes, rods and other molded articles, pneumatic or solid tires or any part thereof, inner tubes, belts which may be either plain, laminated or reinforced, hose, mechanical goods, wire and cable jackets, footwear, coated fabrics, films, coating compositions, adhesives, cellular products, and any other applications for which other elastomers are suitable.

It is possible to prepare products by the process of this invention which are essentially identical with products prepared by reacting the corresponding long-chain glycol, organic diisocyanate and water in the appropriate molar proportions. The process of this invention is advantageous in that high molecular weight bis-chloroformates are more easily prepared from the corresponding glycols than are diisocyanates from the corresponding diamines, so that the starting materials for the present process are less expensive. The process of this invention is also advantageous in that it is carried out using an aqueous slurry which is easily agitated, whereas the formation of the same products from the direct reaction between a long-chain glycol, a diisocyanate and a chain extending agent requires heavy-duty mixing equipment.

This application is a continuation-in-part of our co-pending U. S. application Serial No. 388,454, filed October 26, 1953, now abandoned.

The embodiments of the invention in which an exclusive property or privilege is claimed are defined as follows:

1. A process of making curable elastomeric condensation products which comprises agitating together in aqueous medium and in the presence of an acid acceptor a bis-chloroformate having a molecular weight of at least 875, a primary diamine, and phosgene, the molar ratio of the bis-chloroformate to phosgene being from 1:0.15 to 1:20 and the ratio of the moles of diamine to the sum of the moles of bis-chloroformate and phosgene being from 0.5:1 to 2.0:1.

2. A process according to claim 1 in which the bis-chloroformate is a polyalkylene ether bis-chloroformate.

3. A process according to claim 2 in which the polyalkylene ether bis-chloroformate is a polytetramethylene ether bis-chloroformate.

4. A process according to claim 3 in which the primary diamine is 2,4-tolylenediamine.

5. A process according to claim 1 in which the bis-chloroformate is a polyester bis-chloroformate.

6. A process according to claim 5 in which the bis-chloroformate is the reaction product of an excess of phosgene with a condensation product of adipic acid and at least one glycol.

7. A process according to claim 1 in which the bis-chloroformate is a reaction product of phosgene with a long-chain compound having at each end a hydroxyl group, said groups being joined to one another by a linear hydrocarbon chain containing no substituents other than halogen atoms and monovalent hydrocarbon radicals containing up to 8 carbon atoms.

8. A process of making a curable elastomeric condensation product which comprises adding a mixture of one mole of a polyalkylene ether bis-chloroformate having a molecular weight of at least 875 and from 0.15 to 10 moles of phosgene to an agitated aqueous medium containing a primary diamine and an acid acceptor, the ratio of moles of diamine to the sum of the moles of bis-chloroformate and phosgene being from 0.5:1 to 2.0:1.

9. A process according to claim 8 in which the aqueous medium containing the diamine and the acid acceptor also contains an acid-stable emulsifying agent.

10. A process of making curable elastomeric condensation products which comprises adding a solution in a hydrocarbon solvent of a mixture of one mole of a polyalkylene ether bis-chloroformate having a molecular weight of at least 875 and from 0.15 to 10 moles of phosgene to an agitated aqueous medium containing a primary diamine, an acid acceptor and an acid-stable emulsifying agent, from 0.5 to 2.0 moles of diamine being present for each mole of phosgene and bis-chloroformate.

11. A process of making curable elastomeric condensation products which comprises adding a toluene solution containing a mixture of one mole of a polytetramethylene ether bis-chloroformate having a molecular weight of at least 875 and from 0.15 to 10 moles of phosgene to an aqueous medium containing 2,4-tolylenediamine, an acid acceptor and an acid-stable emulsifying agent, from 0.5 to 2.0 moles of the diamine being present for each mole of phosgene and the bis-chloroformate.

References Cited in the file of this patent

UNITED STATES PATENTS

| 2,660,574 | Jones | Nov. 24, 1953 |
| 2,757,191 | Stilmar | July 31, 1956 |

FOREIGN PATENTS

| 461,237 | Great Britain | Feb. 9, 1937 |
| 895,395 | France | Apr. 3, 1944 |
| 904,939 | France | Mar. 26, 1945 |
| 904,471 | Germany | Feb. 18, 1954 |
| 912,863 | Germany | June 3, 1954 |

OTHER REFERENCES

Petersen: Annalen des Chemie, vol. 562, 1949 pp. (205-228), 209 and 222. (Copy in Scientific Library.)